United States Patent
Yadav et al.

(10) Patent No.: US 11,984,125 B2
(45) Date of Patent: May 14, 2024

(54) SPEECH RECOGNITION USING ON-THE-FLY-CONSTRAINED LANGUAGE MODEL PER UTTERANCE

(71) Applicant: Cisco Technology, Inc., San Jose, CA (US)

(72) Inventors: Rishabh Gupta Yadav, San Francisco, CA (US); Kareem Nassar, San Carlos, CA (US); Sylvain Le Groux, San Francisco, CA (US); Matthew James Ceravolo, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 374 days.

(21) Appl. No.: 17/361,927

(22) Filed: Jun. 29, 2021

(65) Prior Publication Data
US 2022/0343913 A1 Oct. 27, 2022

Related U.S. Application Data

(60) Provisional application No. 63/178,646, filed on Apr. 23, 2021.

(51) Int. Cl.
*G10L 15/26* (2006.01)
*G10L 15/08* (2006.01)

(52) U.S. Cl.
CPC ............. *G10L 15/26* (2013.01); *G10L 15/08* (2013.01)

(58) Field of Classification Search
CPC .................... G10L 15/26; G10L 15/08
See application file for complete search history.

(56) References Cited

U.S. PATENT DOCUMENTS

| | | | |
|---|---|---|---|
| 9,934,777 B1* | 4/2018 | Joseph | G10L 15/22 |
| 9,966,066 B1* | 5/2018 | Corfield | G10L 15/142 |
| 2014/0379334 A1 | 12/2014 | Fry | |
| 2015/0348547 A1* | 12/2015 | Paulik | G10L 15/197 |
| | | | 704/251 |
| 2016/0379629 A1 | 12/2016 | Hofer et al. | |
| 2018/0108346 A1 | 4/2018 | Paulik et al. | |
| 2018/0374484 A1 | 12/2018 | Huang et al. | |

(Continued)

FOREIGN PATENT DOCUMENTS

WO 2016/094418 A1 6/2016

OTHER PUBLICATIONS

Hall, Keith, et al. "Composition-based on-the-fly rescoring for salient n-gram biasing." (2015). (Year: 2015).*

(Continued)

*Primary Examiner* — Brian L Albertalli
(74) *Attorney, Agent, or Firm* — Edell, Shapiro & Finnan, LLC

(57) ABSTRACT

Presented herein are techniques for augmenting a speech recognition engine. According to the disclosed techniques, audio data is obtained as part of an automatic speech recognition session. Speech hints are also obtained as part of the automatic speech recognition session. A dynamic language model is generated from the speech hints for use during the automatic speech recognition session. A combined language model is then generated from the dynamic language model and a static language model. Finally, the audio data is converted to text using the combined language model as part of the automatic speech recognition session.

20 Claims, 10 Drawing Sheets

(56) References Cited

U.S. PATENT DOCUMENTS

| | | | | |
|---|---|---|---|---|
| 2020/0349930 | A1* | 11/2020 | Al Bawab | H04M 3/567 |
| 2022/0036893 | A1* | 2/2022 | Gandhe | G10L 15/065 |
| 2022/0093087 | A1* | 3/2022 | Nie | G10L 15/193 |

OTHER PUBLICATIONS

Yazdani, Reza, Jose-Maria Arnau, and Antonio González. "Unfold: A memory-efficient speech recognizer using on-the-fly wfst composition." Proceedings of the 50th Annual IEEE/ACM International Symposium on Microarchitecture. 2017. (Year: 2017).*

Novak, Josef R., Nobuaki Minematsu, and Keikichi Hirose. "Dynamic grammars with lookahead composition for wfst-based speech recognition." Thirteenth Annual Conference of the International Speech Communication Association. 2012. (Year: 2012).*

Hetherington, I. Lee. "A multi-pass, dynamic-vocabulary approach to real-time, large-vocabulary speech recognition." Ninth European Conference on Speech Communication and Technology. 2005. (Year: 2005).*

Wilson, Paul R. "Uniprocessor garbage collection techniques." International Workshop on Memory Management. Berlin, Heidelberg: Springer Berlin Heidelberg, 1992. (Year: 1992).*

Bulusheva, et al., "An Efficient Method for Vocabulary Addition to WFST Graphs," International Conference on Text, Speech, and Dialogue, SD 2016: Text, Speech, and Dialogue, Sep. 2016, 8 pages.

Malkovsky, et al., "Techniques for Vocabulary Expansion in Hybrid Speech Recognition Systems," https://arxiv.org/abs/2003.09024, Mar. 2020, 5 pages.

Allauzen, et al., "Rapid Vocabulary Addition to Context-Dependent Decoder Graphs," 16th Annual Conference of the International Speech Communication Association, Interspeech 2015, Sep. 2015, 5 pages.

Schalkwyk, et al., "Speech Recognition with Dynamic Grammars Using Finite-State Transducers," 8th European Conference on Speech Communication and Technology, Eurospeech 2003, Sep. 2003, 4 pages.

Kaldi, "Support for grammars and graphs with on-the-fly parts," http://kaldi-asr.org/doc/grammar.html, retrieved Jun. 28, 2021, 9 pages.

Nguyen, et al., "Improving Sequence-to-Sequence Speech Recognition Training With On-the-Fly Data Augmentation," https://arxiv.org/abs/1910.13296, Feb. 2020, 5 pages.

Miao, et al., "EESEN: End-to-End Speech Recognition Using Deep RNN Models and West-Based Decoding," https://arxiv.org/abs/1507.08240, Oct. 2015, 8 pages.

Strimel, et al., "Rescore in a Flash: Compact, Cache Efficient Hashing Data Structures for N-gram Language Models," https://www.amazon.science/publications/rescore-in-a-flash-compact-cache-efficient-hashing-data-structures-for-n-gram-language-models, May 2020, 5 pages.

Github, "Google.Cloud.Speech.V1.RecognitionConfig.SpeechContexts has no effect on results," https://github.com/googleapis/google-cloud-dotnet/issues/3010, retrieved Jun. 29, 2021, 5 pages.

Chiu, et al., "State-of-the-Art Speech Recognition With Sequence-to-Sequence Models, " https://arxiv.org/pdf/1712.01769.pdf, Feb. 2018, 5 pages.

Stackoverflow, "Google Cloud Speech API. Help getting Google's own example to work," https://stackoverflow.com/questions/53797626/google-cloud-speech-api-help-getting-googles-own-example-to-work, retrieved Jun. 29, 2021, 3 pages.

* cited by examiner

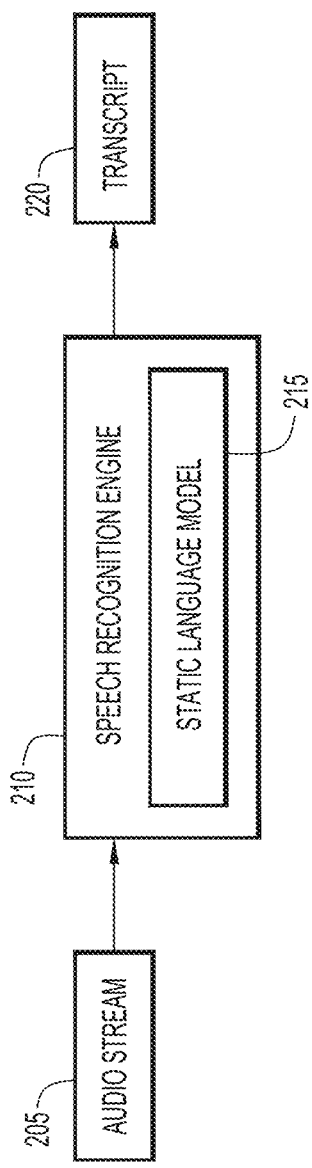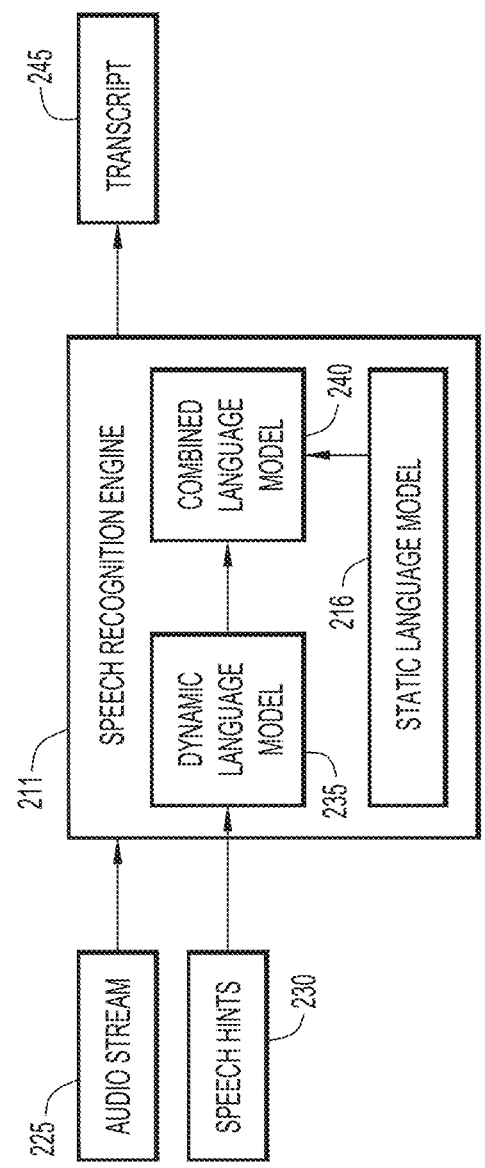

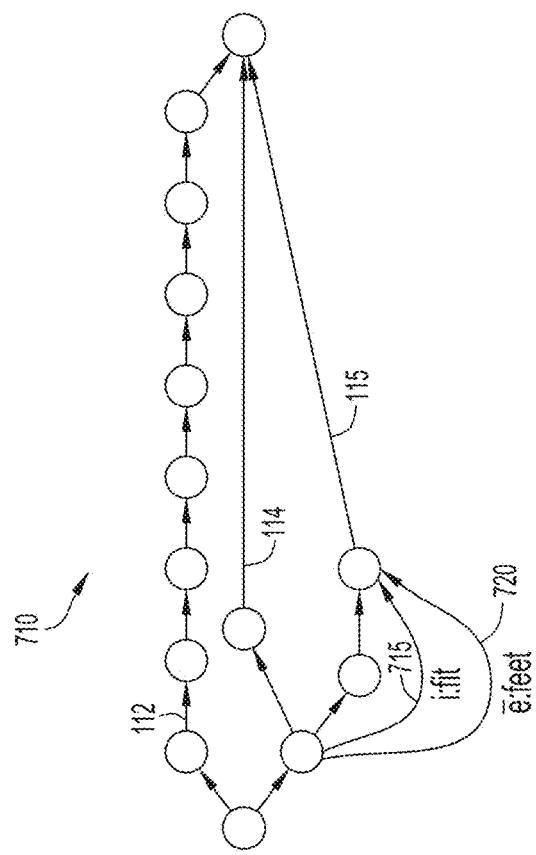
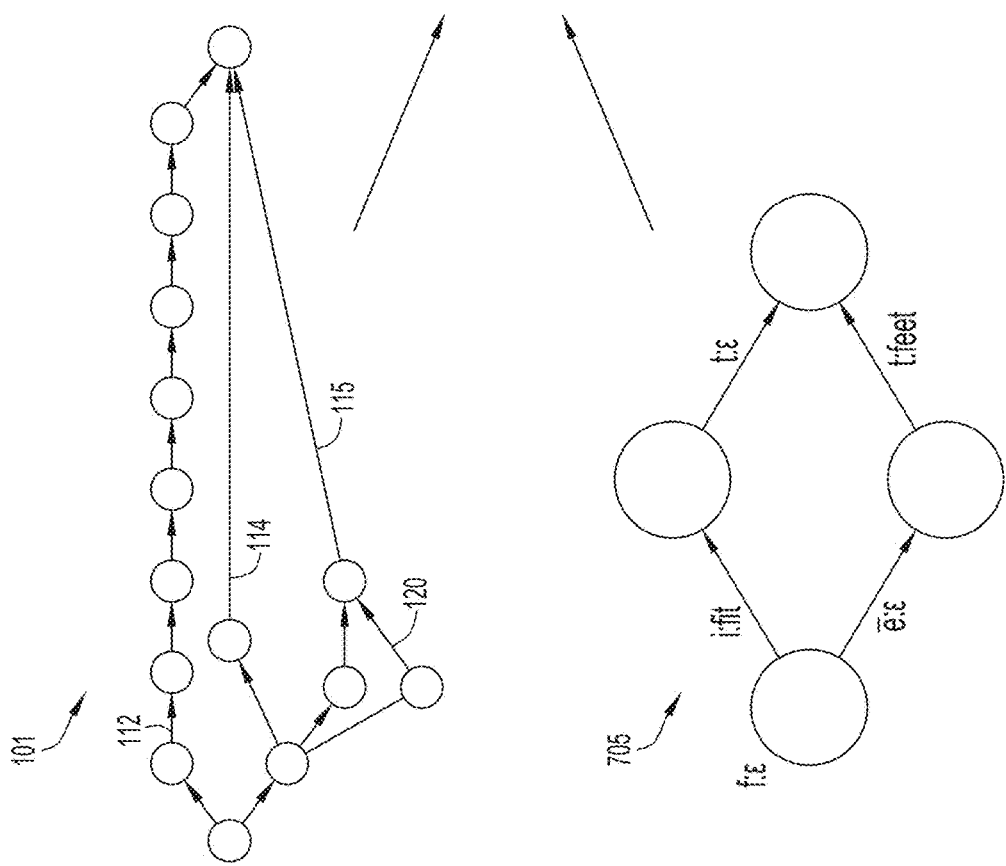
FIG. 7

SPEECH RECOGNITION USING ON-THE-FLY-CONSTRAINED LANGUAGE MODEL PER UTTERANCE

CROSS REFERENCE TO RELATED APPLICATIONS

This application claims the benefit of U.S. Provisional Application No. 63/178,646, filed Apr. 23, 2021, the entirety of which is incorporated herein by reference.

TECHNICAL FIELD

The present disclosure relates to techniques for providing accurate Automatic Speech Recognition (ASR).

BACKGROUND

Hybrid Hidden Markov Model Deep Neural Network Automatic Speech Recognition (HMM-DNN ASR) may utilize fixed-sized vocabularies, which may lead to inaccurate transcription of domain specific data. Increasing the size of the model's vocabulary (e.g., to include as many domain-specific words as possible) increases the size of the decoding graph considerably, which becomes prohibitive in terms of memory and decoding speed.

Accordingly, such HMM-DNN ASR techniques are faced with a tradeoff between the generality of a base model that is efficient enough for real-time decoding and the addition of domain-specific words at decoding time. In other words, while adding domain specific words to a vocabulary may significantly improve the transcription accuracy, the addition of the domain specific words may negatively affect the efficiency and cost of the ASR system, both in terms of speed and storage requirements.

BRIEF DESCRIPTION OF THE DRAWINGS

FIGS. 2A and 2B illustrate a comparison between generating a transcript using related art Automatic Speech Recognition (ASR) techniques and generating a transcript using the ASR techniques of the present disclosure, according to an example embodiment.

FIG. 7 illustrates a second combined language model generated from a static language model into which a dynamic language model has been spliced, according to an example embodiment.

DESCRIPTION OF EXAMPLE EMBODIMENTS

Overview

Figure 1A:
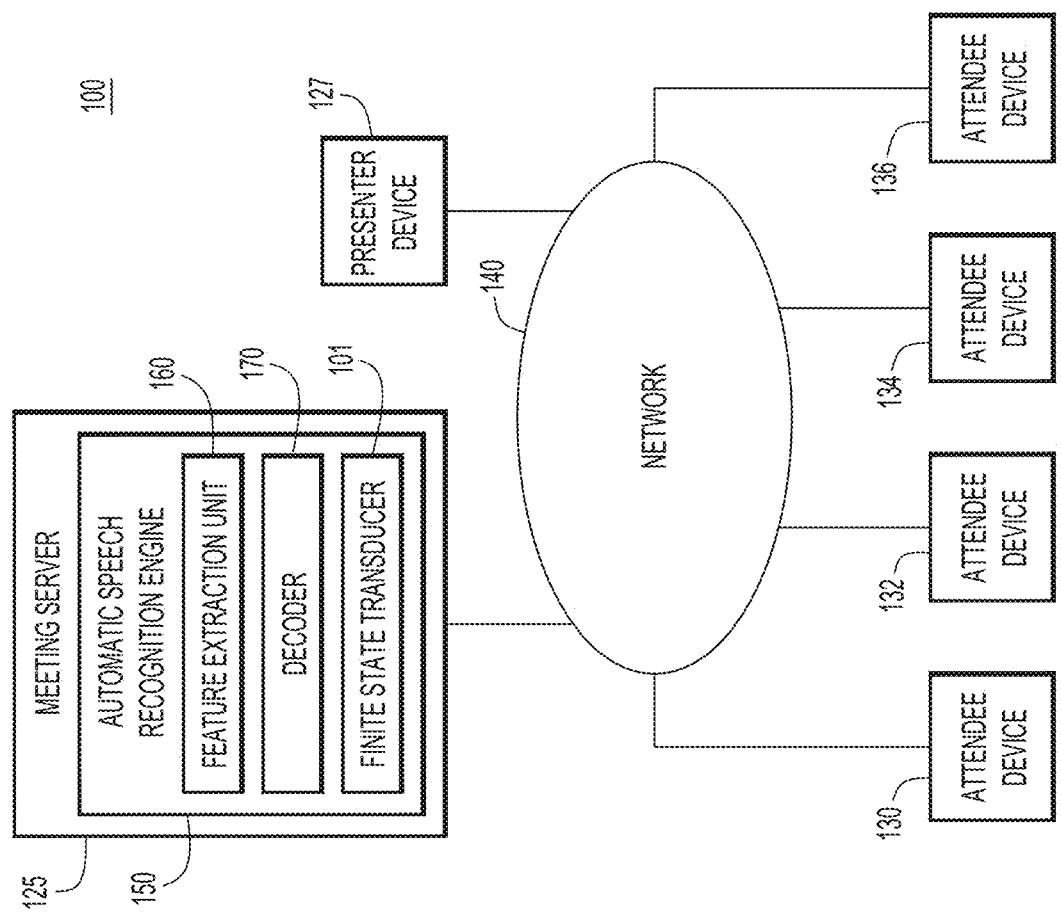
FIGS. 1A and 1B illustrate an automatic speech recognition system and accompanying static language model, embodied as a Finite State Transducer (FST), according to an example embodiment.

Presented herein are techniques for augmenting an automatic speech recognition (ASR) engine to detect certain words on-the-fly during a speech recognition session. According to example embodiments, a dynamically generated language model, such as a Finite State Transducer (FST), is spliced into a static language model. The dynamically generated language model may be generated on a per-utterance basis and similarly spliced into the static language model on a per-utterance basis. According to other example embodiments, the dynamically generated language model may be generated and spliced into the static language model with a different level of granularity, such as on a per-ASR session basis.

Therefore, example embodiments provide for methods that may include the following operations. First, audio data is obtained as part of an automatic speech recognition session. Speech hints are also obtained as part of the automatic speech recognition session. A dynamic language model is generated from the speech hints for use during the automatic speech recognition session. A combined language model is then generated from the dynamic language model and a static language model. Finally, the audio data is converted to text using the combined language model as part of the automatic speech recognition session.

Example Embodiments

According to the techniques of the present disclosure, a Weighted Finite-State Transducer (WFST)-based ASR is utilized within a framework that allows modification of the ASR language model. According to specific example embodiments, modifications are made to decoding graphs or FSTs to include desired Out-Of-Vocabulary (OOV) domain-specific words or speech hints. This modification of language models may take place on a per-utterance basis, on a per-ASR session basis, or with a level of granularity between these two.

As used herein, an "utterance" is a portion of an audio stream during which someone is speaking. Times during the audio stream where no speech is recorded may not be included in utterances. As understood by the skilled artisan, an audio stream may be separated into utterances using voice activity detection. Accordingly, the language model modification techniques of the present disclosure may be applied to an audio stream on a per-audio stream basis, a per-utterance basis, or some other level of granularity known the skilled artisan, such as on a per-slide basis when a presentation or slide deck is associated with the audio stream. Similarly, the techniques of the present disclosure may be applied on a per-video basis when a video stream is associated with the audio stream.

Related art Hybrid Hidden Markov Model Deep Neural Network (HMM/DNN) Finite-State Transducer (FST)-based speech recognizers may implement multiple approaches to language model modification, including dynamic grammar approaches and efficient vocabulary addition approaches, but these techniques differ from those of the present disclosure in both operation and effect.

For example, in dynamic grammar approaches, two separate vocabulary graphs are created, but the combination of these graphs may be slow. Specifically, dynamic grammar approaches stitch together a large base static grammar graph (or language model) with a smaller pre-compiled domain specific grammar (for instance, a user-specific contact list) which is added to the decoding graph at decoding time. This is achieved in Kaldi FST frameworks by adding special "non-terminal" symbols to the base FST lexicon which can be referenced later to stitch the separate base and domain-specific graphs. In other words, these non-terminal symbols provide links between the separate base and domain-specific graphs. The pre-compiling of the domain specific grammar may slow down the ASR process or introduce other performance constraints on the ASR provided by these dynamic grammar approaches. The use of pre-compiled domain specific grammars may also increase the on disk memory storage utilized in ASR systems.

In efficient vocabulary addition approaches, on the other hand, new words are added via a previously prepared word template list that maintains cross-word context dependency. Efficient vocabulary addition approaches prepare in advance a list of place-holder words in the lexicon for every possible "start_phoneme-end_phoneme" pair. This allows for the later replacement of the placeholder with an actual domain-specific word that starts and ends with the corresponding phonemes. Via this mechanism, the context dependency is preserved at the boundaries. This feature allows users to specify phrases that are likely to appear in the accompanying audio. These phrases will bias the decoding of the audio, resulting in a higher likelihood of those phrases in the transcript. The phrases may contain OOV words, and the decoding will incorporate them in the language model. As noted above, these efficient vocabulary approaches rely on previously prepared word template lists, which may prevent the techniques from addressing OOV words or phrases that are determined immediately prior to or during an ASR session.

The following example embodiments provide techniques in the context of an efficient vocabulary addition approach, utilizing placeholder words or paths through ASR language models, as such approaches are computationally efficient and may not significantly impact the accuracy of the transcription. Though, the techniques of the present disclosure are not limited to efficient vocabulary addition approaches.

According to specific example embodiments, the techniques of the present disclosure may utilize an ASR system, such as ASR engine 150 illustrated in FIG. 1A. Specifically, ASR engine 150 may be incorporated into an online meeting or conference system 100 that enables a meeting server 125 to facilitate an online conference session (e.g., a web-based meeting) in which users can share voice, video, chat, and/or other types of data communication through presenter device 127 and attendee devices 130, 132, 134, and 136 over network 140. The online conference session may further involve desktop sharing and/or application sharing. Accordingly, in the example embodiment of FIG. 1A, ASR engine 150 is used to perform ASR processing for audio data generated during online conference sessions hosted by meeting server 125. While ASR engine 150 is configured to provide ASR processing for online conference sessions, the techniques of the present disclosure are not limited to this use case. The techniques of the present disclosure may be applied to practically any ASR system and/or ASR application.

Included in ASR engine 150 are feature extraction unit 160, decoder 170 and a language model embodied as FST 101. Feature extraction unit 160 extracts audio features, such as utterances, from audio data provided to ASR engine 150. Decoder 170 then processes these features using FST 101 to convert the audio features into text.

Figure 1B:
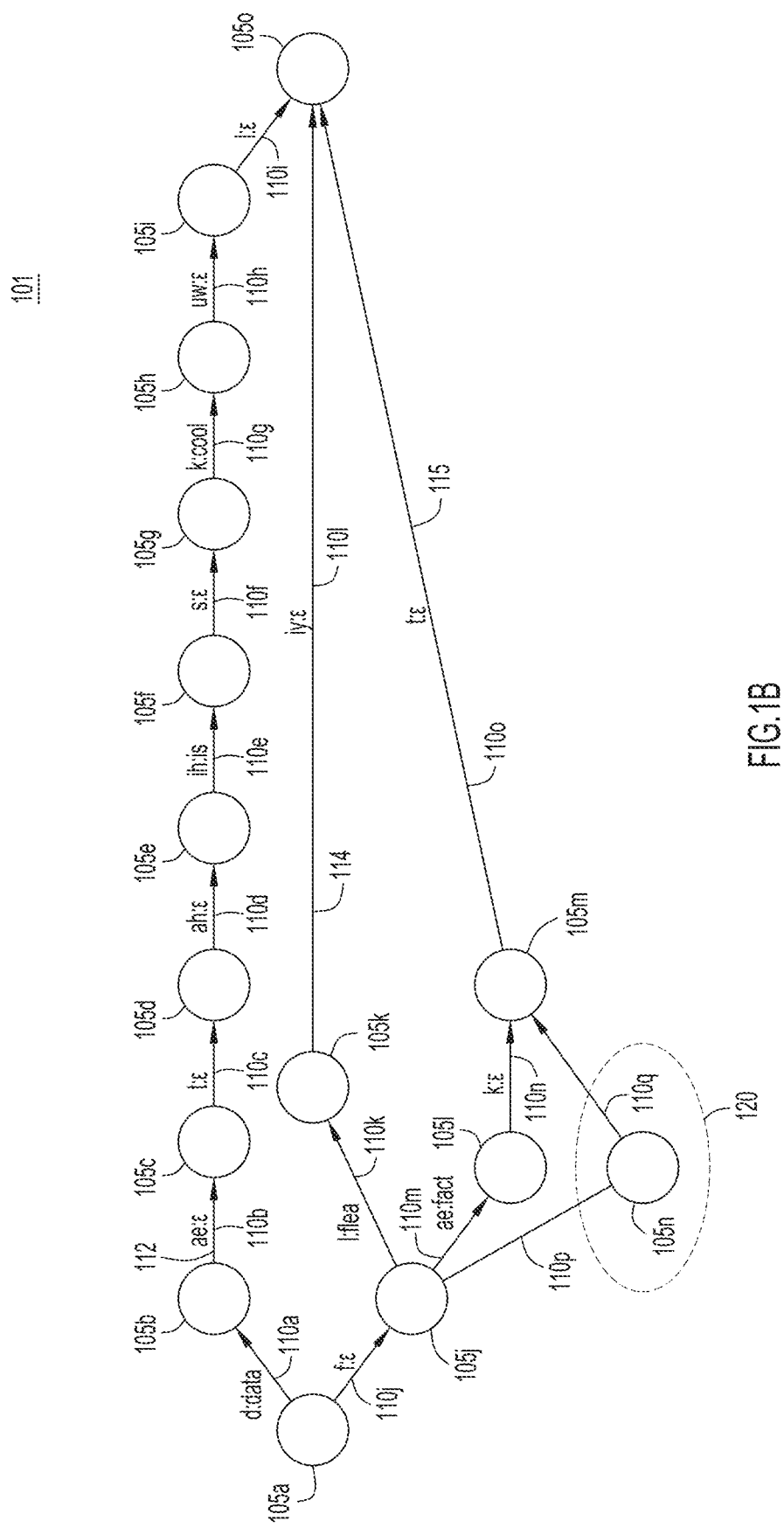

Turning to FIG. 1B, illustrated therein is a detailed view of FST 101. An FST, and FST 101 in particular, is a graph that converts input symbols to output symbols as arcs are traversed through the FST. An FST like FST 101 allows audio features to be converted into words or phrases by traversing paths through the FST. For example, FST 101 is a finite automaton that accepts a language in the form of phonemes and converts these phonemes into graphemes by travelling through arcs contained within FST 101. Specifically, FST 101 includes states 105*a-o* and labeled arcs or edges 110*a-q* connecting states 105*a-o*. As illustrated in FIG. 1B, each arc or edge 110*a-q* is labelled with the value for its prior state (i.e., the input to the edge) and the state to which it leads (i.e., the output of the edge). For example, edge 110*a* leads from the input state 105*a*, and indicates that an input value of "d" will ultimately result in identifying the word "data" along path 112. Edge 110*j* also leads from input state 105*a*, but processes audio with the "f" phoneme. There are also multiple possible results in FST 101 for sounds that begin with the "f" phoneme, specifically the words "flea" and "fact," so the output for edge 110*j* is designated with the Greek letter epsilon, "ε." Edges may also be labeled with a weight associated with the edge, such as edge 410 of FIG. 4. Edge 410 has an input value "n" and an output value of "in," with an associated weight of "0.5."

Returning to FIG. 1B, a first path 112 through FST 101, which includes states 105*a-i* and 105*o* and edges 110*a-i*, allows an ASR system to recognize the phrase "data is cool." More specifically, state 105*a* represents an input state, and edge 110*a* is representative of the sound or phoneme associated with the letter "d" in the word "data." If the "d" phoneme is detected in the audio data being processed, edge 110*a* directs the processing to state 105*b*. Edge 110*b* is representative of the "ae" phoneme, i.e., the phoneme associated with the first letter "a" in the word "data." If the "ae" phoneme is detected in the audio data, edge 110*b* directs the processing of the audio data to state 105*c*. Edge 110*c* is representative of the sound associated with the letter "t" in the word "data." If the "t" phoneme is detected in the audio data, edge 110*c* directs the processing of the audio data to state 105*d*. This processing continues along edges 110*d-i* and states 105*e*-105*i* until all of the sounds in the expression "data is cool" are processed, eventually reaching output state 105*o*. Output state 105*o* would result in the text data "data is cool" being included in a transcript of the audio data being processed.

A second path 114 through FST 101, which includes states 105*a*, 105*j* and 105*k* and edges 110*j*, 110*k* and 110*l*, allows an ASR system to recognize the word "flea," and a third path 115, which includes states 105*a*, 105*j*, 1051 and 105*m* and edges 110*j*, 110*m*, 110*n* and 110*o*, through FST 101, allows an ASR system to recognize the word "fact." The processing of audio data along paths 114 or 115 would be analogous to the processing described above with reference to path 112.

According to the techniques of the present disclosure, FST 101 is constructed with specific placeholder arcs that can be replaced by dynamic phrases. These placeholder arcs are created by adding fake words to the language model for each pair of start and end phonemes. Where the "non-terminal" symbols used in Kaldi FST frameworks provide links between separate FSTs during ASR decoding, the placeholder arcs used in the techniques of the present disclosure may be replaced by arcs from a dynamic FST, resulting in a single combined FST that is traversed during ASR decoding.

Placeholder arc 120 of FST 101 is an example of such a placeholder arc. Placeholder arc 120 provides a full arc through FST 101. More specifically, placeholder arc 120 includes placeholder edges 110*p* and 110*q* and placeholder state 105*n*. According to other example embodiments, placeholder arc 120 may include more or fewer edges and states. For example, a first alternative embodiment may include a placeholder arc comprised of a single placeholder edge. According to a second alternative example embodiment, the placeholder arc may be comprised of two placeholder states and three placeholder edges.

Placeholder arc 120 may contain a unique inner phoneme sequence to ensure it does not conflict with any words found in the language model represented by FST 101. Specifically, it has been found that in certain example embodiments, adding placeholder phonemes to an FST like FST 101 may result in an increased Word Error Rate (WER) for the model. Accordingly, placeholder arc 120 may contain a unique phoneme not likely to be found in the audio data being processed by FST 101.

Because placeholder arc 120 is arranged between the state associated with having identified the "f" phoneme ("f:ε"), state 105*j*, and the state associated with having identified the "t" phoneme ("t:ε"), it may be replaced with states and edges that would identify words such as "fat," "fit," "fast," "feet," "fight," or "fort," among others. This placeholder arc 120 may also be replaced with states and edges that would identify phrases that begin with the "f" phoneme ("f:ε") and end with the "t" phoneme ("t:ε"), such as "fit people run fast" or "fry a tater tot."

If placeholder arc 120 is not needed to hold dynamically added words or phrases, placeholder arc 120 may be deleted from FST 101 to ensure there is no degradation of WER when no speech hints are provided that would be added between states 105*j* and 105*m*. According to other example embodiments, the weight or weights associated with placeholder arc 120 may be set such that processing will not proceed along placeholder arc 120 unless it is replaced with dynamically added words or phrases, at which time the weights for the dynamically added words or phrases would be set appropriately.

The techniques of the present disclosure, by which placeholder arc 120 would be replaced with dynamically added words or phrases, will now be described in more detail with reference to FIGS. 2A and 2B. Specifically, FIG. 2A illustrates related art techniques for automatic speech recognition sessions, while FIG. 2B illustrates the techniques of the present disclosure. As used herein, an automatic speech recognition session, or ASR session, begins when a language model for use by an automatic speech recognition engine is loaded into the Random Access Memory (RAM) for one or more processors performing the ASR processing. As shown in FIG. 2A, in related art techniques, an audio stream 205 is passed to speech recognition engine 210. A static language model 215 (e.g., a static FST) is used to generate a transcript 220 using words included in the static language model 215.

As used herein, "static" refers to a model that is not updated during an automatic speech recognition session. A static language model and/or a static FST may be a global model or FST that applies to all or numerous automatic speech recognitions sessions processed by a particular speech recognition engine. A static language model and/or a static FST may also be a model or FST that applies to particular types of automatic speech recognition sessions (e.g., recognition of speech in a video conference) or that applies to a particular user (e.g., a user specific language model or FST). Static language models and/or FSTs may also be stored in persistent memory for use with multiple automatic speech recognition sessions. Static language model 215 may not include placeholder arcs, such as placeholder arc 120 of FIG. 1B, because the process illustrated in FIG. 2A does not include the augmenting of static language model 215 with a dynamic language model. Static language model 216 of FIG. 2B, on the other hand, may contain placeholder arcs because static language model 216 will be augmented with a dynamic language model to form a combined language model, as described further below. Dynamic and/or combined language models or FSTs may be generated within the RAM of one or more processing devices implementing an automatic speech recognition session.

According to the example embodiments of the techniques of the present disclosure illustrated in FIG. 2B, phrases or speech hints 230 are passed to the speech recognition engine 211 alongside the audio stream 225. Speech hints 230 may be embodied as text data that indicate words and/or phrases that are determined to likely be contained within audio stream 225. Additionally, speech hints 230 may be sent to the speech recognition engine through an Application Programming Interface (API) call.

According to specific example embodiments, speech hints 230 may be embodied as meeting metadata from an on-line collaborative session or video conference, such as meeting titles and participant names. Such metadata is likely to be uttered during the audio associated with an on-line collaborative session or video conference. Therefore, augmenting static language model 216 with these speech hints may improve the WER of the transcript of the audio data associated with the meeting. The metadata contained in such speech hints may be harvested automatically from the meeting information.

Speech hints 230 may also be embodied as meeting content from an on-line collaborative session or video conference, such as presentation slide content. Much like the meeting metadata, meeting content is likely to be uttered during the audio associated with an on-line collaborative session or video conference. Therefore, augmenting static language model 216 with meeting content speech hints may improve the WER of the transcript of the audio data associated with the meeting.

The passing of meeting metadata or meeting content as speech hints 230 may be implemented in real-time. For example, speech hints 230 may be updated based on updates to the participant list for the meeting. Accordingly, the participant names included in speech hints 230 may be passed to speech recognition engine 211 in real-time as participants join and leave a meeting. Similarly, meeting content speech hints may be updated as the meeting presenter advances through a slide deck or other materials. Accordingly, the meeting content included in speech hints 230 may be passed to speech recognition engine 211 in real-time as the content being presented at the meeting changes.

According to other example embodiments, speech hints 230 may be mined using Natural Language Processing (NLP) techniques. For example, NLP techniques may be used to mine relevant words from company websites or other sources of text associated with audio stream 225. The mined words or phrases may be passed to speech recognition engine 211 automatically along with audio stream 225, resulting in improved accuracy in transcripts 245 provided by speech recognition engine 211. The techniques of the present disclosure may also be used to provide a feedback loop for such NLP techniques. For example, speech recognition engine 211 may identify a website or other data source referenced within audio stream 225. Speech recognition engine 211 may then provide an NLP process with an indication of these data sources. The NLP process would then, in turn, mine these data sources for additional speech hints to provide to speech recognition engine 211.

Speech hints 230 may also be embodied as token classes. As used herein, a "token class" refers to a value which may be expanded in memory to include all known examples of that class. For example, by including "CITY_NAME" as a token class in speech hints 230, speech recognition engine 211 may include a class of values that includes a predetermined list of city names in the values that are used to generate dynamic language model 235. The resulting transcript 245 would, as a result, have a higher probability of matching city names known to speech recognition engine 211.

Additionally, sending values as token classes provides context to speech recognition engine 211, which may assist speech recognition engine 211 in constructing combined language model 240 with appropriate weights. For example, if both a "CITY_NAME" token class and a "STATE_NAME" token class are passed to speech recognition engine 211, the values of the "STATE_NAME" token class may be more heavily weighted if they follow a value in the "CITY_NAME" token class in combined language model 240. For example, a state name may be more likely to follow a city name because individuals may speak their address as their city followed by their state. If city and state names are passed to speech recognition engine 211 as tokens, speech recognition engine 211 may be made aware that these values are, in fact, city and state names, respectively. Therefore, combined language model 240 may be constructed such that it is more likely to recognize a state name following a city name. On the other hand, if lists of state and city names are simply included in speech hints 230 without this context, speech recognition engine 211 might not construct combined language model 240 such that it is more likely to recognize a state name following a city name. Furthermore, by including such token classes in speech hints 230, the API passing speech hints 230 does not need to pass each value in the token class individually.

Regardless of the type of hints contained within speech hints 230, the contents of speech hints 230 may either augment or constrain static language model 216 to the set of phrases contained in the speech hints 230 when generating combined language model 240. Constraining static language model 216 allows for certain use cases, which require a specific type of transcript, to have improved WER. An example of a use case in which the speech hints 230 may be used to constrain static language model 216 is an interactive telephone voice response system in which the telephone system knows what type of answer is expected, such as a phone number or a "yes/no" command phrase. According to such a use case, combined language model 240 may be limited to the values contained in speech hints 230. As with other speech hints, token classes may be used to constrain static language model 216 such that combined language model 240 is limited to values contained within speech hints 230. For example, when speech recognition engine 211 expects to receive an address in audio stream 225, combined language model 240 may be generated such that it will only recognize address token class values.

Once speech hints 230 are received, speech recognition engine 211 constructs dynamic language model 235 from the words or phrases contained within the text data of speech hints 230. As described with reference to FIG. 3 below, pronunciations are determined for the text data contained within speech hints 230 using a grapheme-to-phoneme model. Dynamic language model 235 is then determined from these pronunciations.

If dynamic language model 235 is embodied as a dynamic FST, the states and arcs or edges of dynamic language model 235 may be represented as n-grams (described with reference to FIG. 3 below). Next, any states and arcs or edges contained in dynamic language model 235 that are not already contained within static language model 216 are spliced into static language model 216 at the correct locations, as described with reference to FIG. 4 below.

The result of splicing the arcs or edges from dynamic language model 235 into static language model 216 is combined language model 240, which may be embodied as a combined FST. Combined language model 240 is referred to as a "combined" language model because it includes states and arcs or edges from both of dynamic language model 235 and static language model 216. Accordingly, combined language model 240 may be generated with the same level of granularity as that at which dynamic language model 235 is generated. In other words, the arcs and edges contained within combined language model 240 may change on a per-ASR session or per-utterance basis, depending on the basis with which dynamic language model 235 is generated.

Using the process illustrated in FIG. 2B, combined language model 240 is configured with the input and output labels, states, and arcs or edges to decode the words and/or phrases contained in speech hints 230. Accordingly, transcript 245 may contain words and/or phrases from both the global vocabulary contained in the static language model 216 and the per-ASR session or per-utterance vocabulary contained in the dynamic language model 235.

Process steps illustrated in FIG. 2B, and the generation of the dynamic language model 235 and the combined language model 240 in particular, may take place within the RAM of a processing device configured to implement the techniques of the present disclosure. By implementing these process steps in the RAM of the processing device, the techniques of the present disclosure may be used to generate dynamic language model 235 and combined language model 240 on a per-ASR session or per-utterance basis.

For example, by generating dynamic language model 235 and the combined language model 240 in RAM of the processing device, the modifications may be made very quickly. At the time of this filing, it has been found that it may take less than 4 seconds to add thousands of phrases to an existing language model, such as static language model 216, to generate combined language model 240. Given this speed, it may not be necessary to precompute and/or store audio stream-specific language models. Instead, dynamic language models, such as dynamic language model 235, may be generated "on-the-fly" during an ASR session on a per-session or per-utterance basis.

Furthermore, after an audio stream and/or automatic speech recognition session is concluded, the in-memory language model (e.g., static language model 216) may be reverted to its original state without modifications, ready for additional requests. For example, combined language model 240 may be reverted to static language model 216 to prepare the language model used during the processing of the audio stream to accept new states and arcs or edges from a new dynamic language model generated from newly received speech hints. In other words, if combined language model 240 is used to process a specific utterance, it may be deleted subsequent to the processing of that specific utterance to make way for the generation of a new combined language model for use with the next utterance.

In other words, the performance achieved by an ASR system may be due to the structure of the process illustrated in FIG. 2B. For example, the ASR system may not need to store user information (e.g., user or ASR session specific hints, user or session specific language models, etc.) as the process illustrated in FIG. 2B may be used to efficiently receive and incorporate such user information into combined language model 240 at runtime. Furthermore, the speed at which these modifications to static language model 216 to generate combined language model 240 occur may enable use cases that were difficult to achieve using related art ASR systems. For example, the techniques of the present disclosure may be used to bias a speech recognition engine on a per-slide basis for audio associated with a video conference at which a slide deck is being presented. Also due to the speed and in-memory nature of example embodiments of the language model augmentation techniques of the present disclosure, the text from each slide as being presented in a video stream may be passed into the speech recognition engine as speech hints (e.g., speech hints 230) making words contained in the presentation more likely to be found in the transcript of the video conference. This performance improvement is a substantial benefit over related art techniques. The techniques of the present disclosure may also handle OOV tokens, which are not commonly accepted in on-the-fly adjustments.

Figure 3:
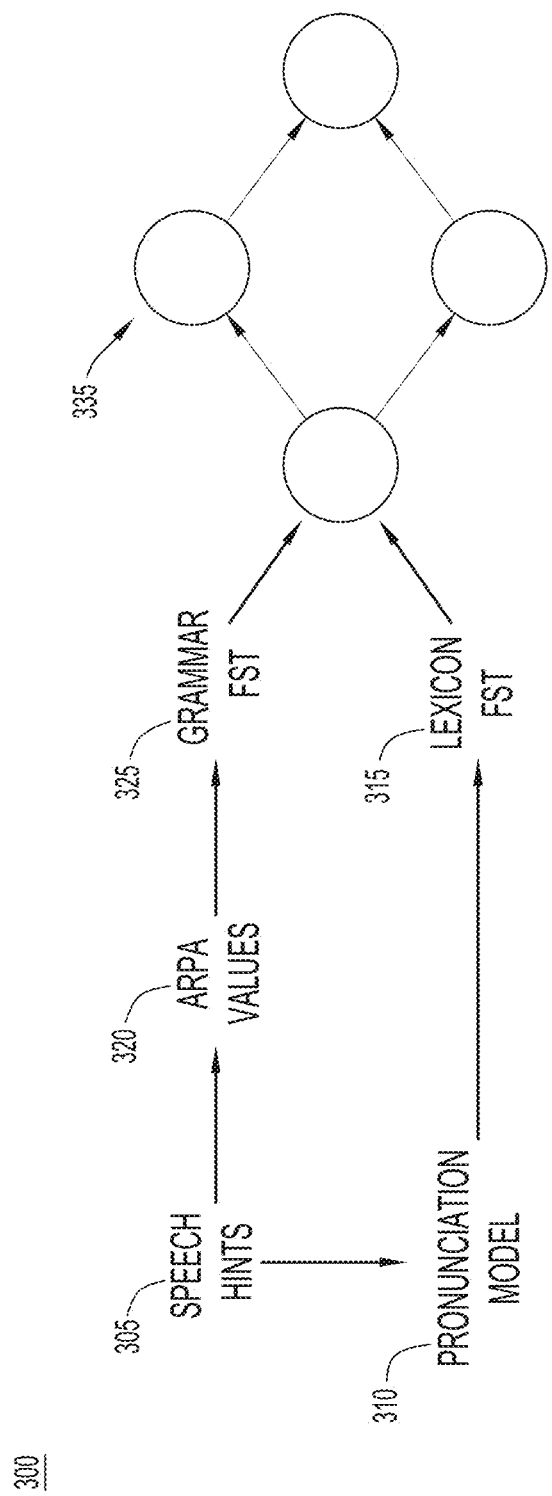
FIG. 3 is a functional flow diagram of a process for generating a dynamic language model, according to an example embodiment.

With reference now made to FIG. 3, depicted therein is a process 300 implemented by a speech recognition engine and used to generate a dynamic language model, such as dynamic language model 235 of FIG. 2B. As shown in FIG. 3, process 300 begins as speech hints 305 are received by a speech recognition engine. Speech hints 305 may be received in the form of, for example, text data. A pronunciation model 310 is applied to speech hints 305 which converts the text data speech hints 305 into phonemes. Phonemes are perceptually different units of sound in a specified language that distinguish one word from another. For example, it is estimated that the English language includes 44 phonemes. The phonemes in the English language include consonant sounds, diagraphs, short and long vowel sounds, and "R" controlled vowel sounds (e.g., the "ar" sound in "car" or the "ir" sound in "bird").

Figure 4:
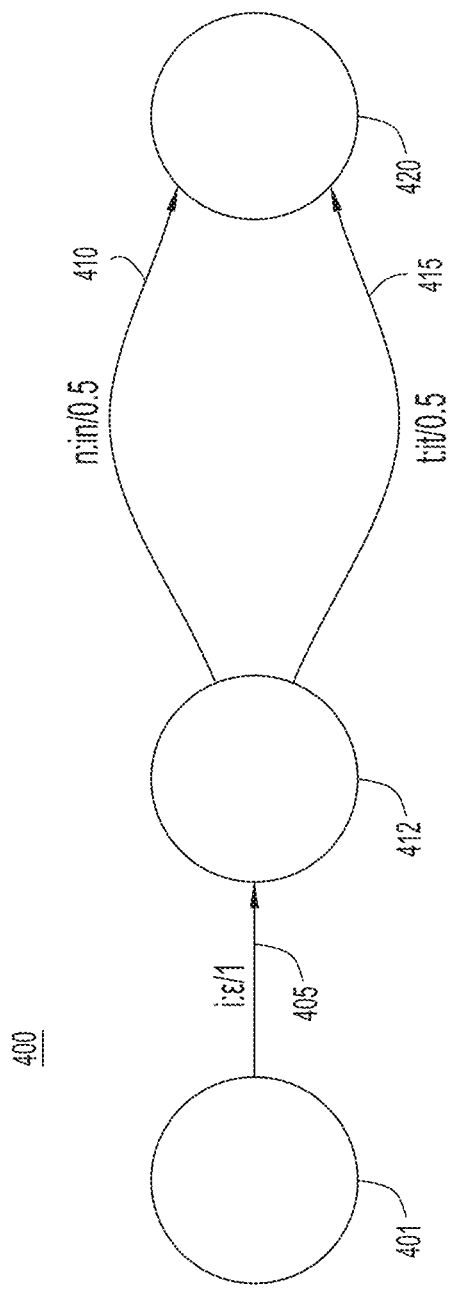
FIG. 4 illustrates a lexicon FST generated in an intermediate step of generating a dynamic language model, according to an example embodiment.

Once the speech hints 305 are converted to phonemes, the phonemes are used to generate a lexicon FST 315. A lexicon FST provides arcs or edges through the FST based on the probability of a phoneme following another phoneme to form a word. An example lexicon FST 400 is illustrated in FIG. 4. As shown in FIG. 4, the lexicon FST 400 provides arcs or edges through the FST based on the probability that the phoneme "n" follows the phoneme for the short vowel sound "i" and for the probability that the phoneme "t" follows the phoneme for the short vowel sound "i." In other words, lexicon FST 400 may be generated from speech hints that include text data for the words "in" and "it." As illustrated in lexicon FST 400, there is 100% probability that the first phoneme received will be the short "i" sound based on the probability of "1" associated with edge 405 between input state 401 and intermediate state 412. It is then equally probable that the next phoneme would be "n" or "t" based on the probabilities of "0.5" associated with edges 410 and 415, respectively, leading to output state 420.

Figure 5:
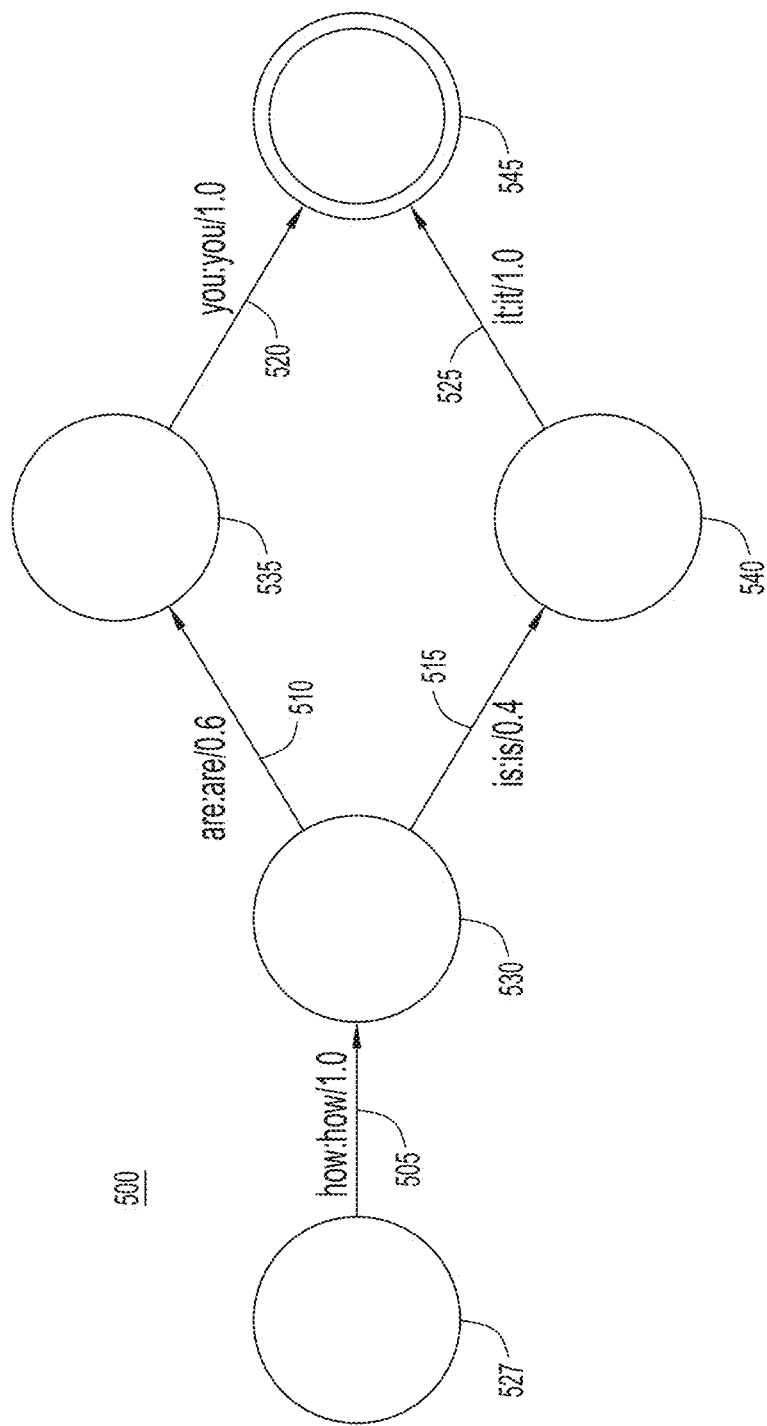
FIG. 5 illustrates a grammar FST generated in an intermediate step of generating a dynamic language model, according to an example embodiment.

Returning to FIG. 3, speech hints 305 are also converted into Advanced Research Projects Agency (ARPA) Language Model format values 320. An ARPA value is the probability of detecting a particular word or phrase. A uni-gram ARPA would be the probability of detecting a single word, a bi-gram ARPA would be the probability of detecting a specific second word following a specific first word, and a 3-gram ARPA would be probability of detecting a specific third word after two specific prior words. A grammar FST 325 is formed from the ARPA values 320. A grammar FST provides arcs through the FST based on the probability of one word following another word, an example of which is illustrated in grammar FST 500 of FIG. 5. Specifically, grammar FST 500 illustrates a grammar FST that may be generated from speech hints that include the phrases "how are you" and "how is it." As illustrated in grammar FST 500 there is 100% probability that "how" would be received (as illustrated by the weight of "1" on edge 505 between input state 527 and intermediate state 530). There is a 60% probability that the next word will be "are" based on the weight of "0.6" on edge 510 (between intermediate states 530 and 535), and a 40% probability that the next word will be "is" based on the weight of "0.4" on edge 515 (between intermediate states 530 and 540). The probability that "you" will follow "are" is 100% based on the weight "1.0" applied to edge 520 (between intermediate state 535 and output state 545). Similarly, the probability that "it" will follow "is" is 100% based on the weight "1.0" applied to edge 525 (between intermediate state 540 and output state 545).

Returning to FIG. 3, grammar FST 325 and lexicon FST 315 are used to form the dynamic FST 335.

Figure 6:
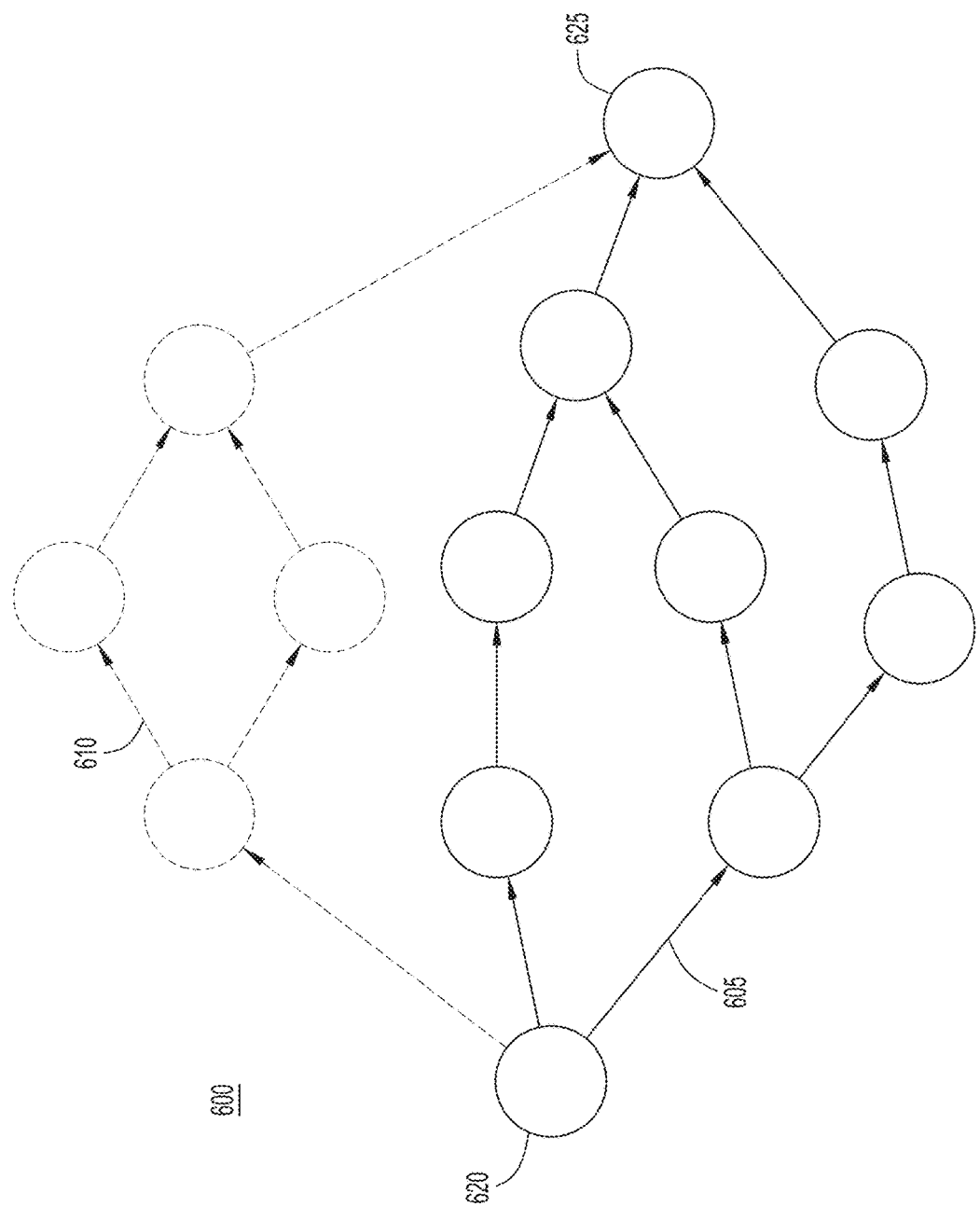
FIG. 6 illustrates a first combined language model generated from a static language model into which a dynamic language model has been spliced, according to an example embodiment.

With reference now made to FIG. 6, depicted therein is a conceptual illustration of a combined FST 600 generated from a static language model 605 (indicated by solid lines), into which a dynamic language model 610 (indicated with dashed lines) has been spliced according to the techniques of the present disclosure. According to example embodiments, static language model 605 included, prior to its combination with dynamic language model 610, placeholder arcs between state 620 and state 625. These placeholder arcs may have included placeholder arcs and edges, or simply a placeholder edge between states 620 and 625. The process illustrated in FIG. 3 may be utilized to generate dynamic language model 610, with the process illustrated in FIG. 2B being used to splice dynamic language model 610 into the placeholder arcs of static language model 605.

FIG. 7 provides a more concrete example in which a dynamic FST 705 is spliced into FST 101 of FIG. 1B. Specifically, dynamic FST 705 is an FST for speech hints of "fit" and "feet," while FST 101 serves as a static FST into which dynamic FST 705 is spliced. As discussed above, static FST 101 includes placeholder arc 120 arranged between the "f" phoneme ("f:ε") and the "t" phoneme ("t:ε"). Accordingly, dynamic FST 705 is spliced into static FST 101 in place of placeholder arc 120, generating combined FST 710. Combined FST 710 includes new edges 715 and 720 for the short "i" phoneme in "fit" and the long "e" phoneme in "feet," respectively.

As indicated above, when ARPA values are used in an FST, each edge in the FST is given a probability that it will follow the state or states that precede it. Accordingly, when dynamic FST 705 is spliced into static FST 101 to form combined FST 710, the weights associated with edges 715 and 720 may be appropriately set to reflect the probability that these edges associated with speech hints will be found in the audio data provided to the automatic speech recognition engine. More specifically, the weights associated with edges 715 and 720 may be different than the weights of the corresponding edges within dynamic FST. Similarly, the weights applied to edges 715 and 720 may be different than the weight applied to placeholder arc 120. For example, because placeholder arc 120 is, as its name implies, a placeholder, it may be weighted with a probability of "0" to ensure that it is not used to process audio data. When dynamic FST 705 is spliced into placeholder arc 120 to form combined FST 710, the weights associated with edges 715 and 720 will be given a different weight than placeholder arc 120. In fact, edges 715 and 720 may be weighted higher than preexisting edges within static FST 101 because they are derived from speech hints associated with the automatic speech recognition session being processed, and therefore, may be more likely to be found in the audio data being processed. According to other example embodiments, the edges within dynamic FST 705 may not be weight until spliced into the placeholder arc 120 of static FST 101 to form combined FST 710.

Figure 8:
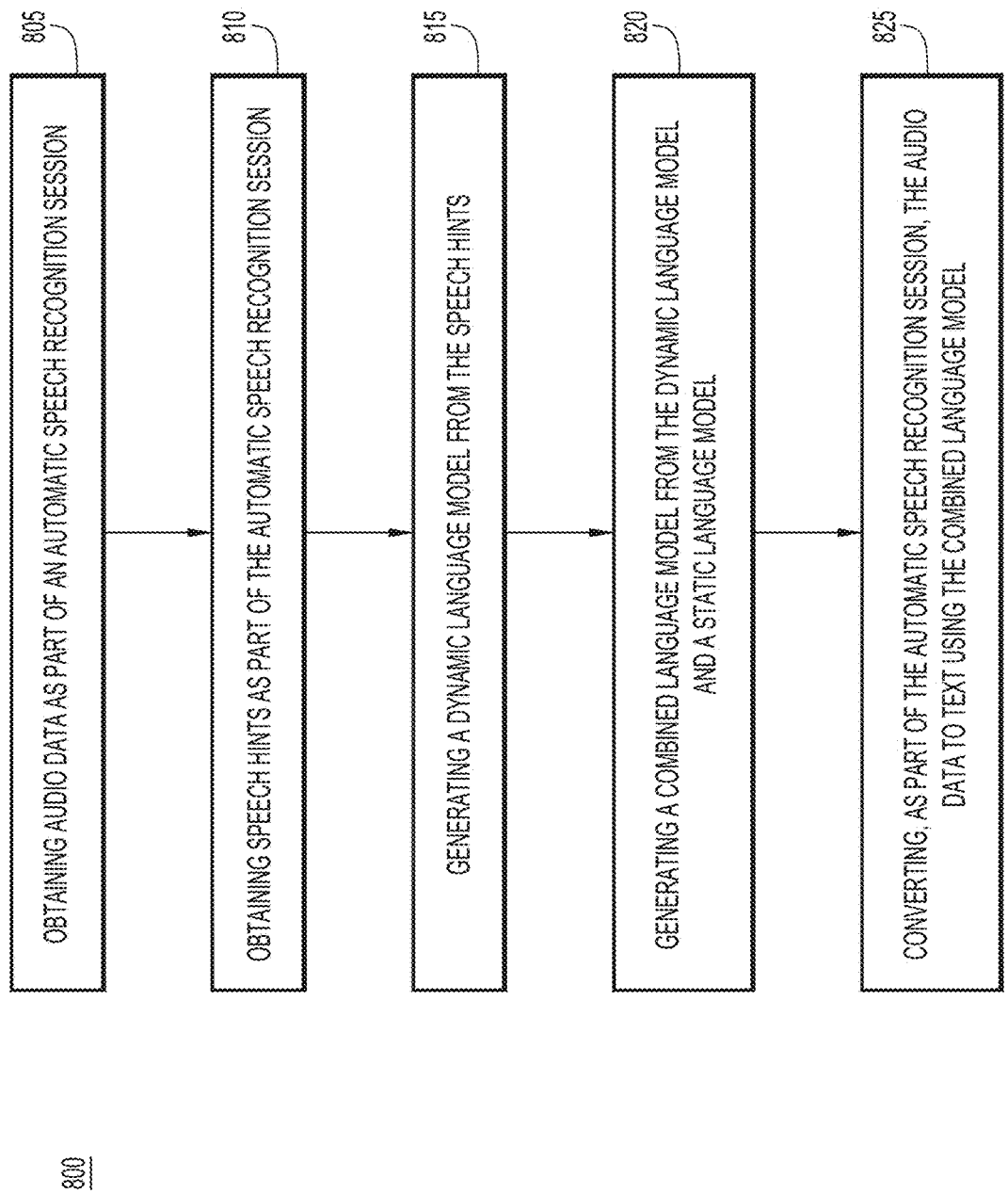
FIG. 8 is a flowchart illustrating a process flow for implementing the techniques of the present disclosure, according to an example embodiment.

With reference now made to FIG. 8, depicted therein is a flowchart 800 illustrating a process flow according to the techniques of the present disclosure. Flowchart 800 begins in operation 805 in which audio data is obtained as part of an automatic speech recognition session. For example, the audio data of operation 805 may be embodied as an audio stream associated with an on-line collaborative session or video conference.

In operation 810, speech hints are obtained as part of the automatic speech recognition session. For example, the speech hints may be embodied as text data for speech or words that are likely to be included in the audio data received in operation 805. Continuing with the example of the on-line collaborative session or video conference discussed in conjunction with operation 805, the speech hints may be embodied as metadata associated with the on-line collaborative session or video conference. According to other example embodiments, the speech hints may be embodied as data being presented during the on-line collaborative session or video conference, such as slide deck text data.

In operation 815, a dynamic language model is generated from the speech hints. The dynamic language model is generated for use during the automatic speech recognition session. According to specific example embodiments, the dynamic language model may be embodied as an FST. According to more specific example embodiments, the dynamic language model may be generated from one or more of a lexicon FST or a grammar FST, which themselves were generated from the speech hints.

In operation 820, a combined language model is generated from the dynamic language model and a static language model. As described above with reference to FIGS. 1A, 1B, 2A, 2B and 3-7, the dynamic language model may be embodied as an FST, as may the static language model. The static language model may be embodied with placeholder locations to accommodate the dynamic language model. Such placeholders may take the form of placeholder arcs through an FST, and generating the combined language model may include splicing the dynamic language model into the placeholder arcs in the static language model.

Finally, in operation 825, the audio data is converted to text using the combined language model during the automatic speech recognition session.

The process of flowchart 800 may be implemented with different levels of granularity. For example, the process of flowchart 800 may be performed on a once-per-ASR session basis. According to other example embodiments, the process of flowchart 800 may be implemented multiple times during an automatic speech recognition sessions, including on a per-utterance basis. For example, the audio data received in operation 805 may be received as a plurality of utterances, and the speech hints of operation 810 may be received on a per-utterance basis. Operation 815 may be implemented on a per-utterance basis to generate a dynamic language model for each utterance received in operation 805. Similarly, a combined language model may be generated in operation 820 for each utterance received in operation 805. Finally, the text generation of operation 825 may be implemented on a per-utterance basis.

Figure 9:
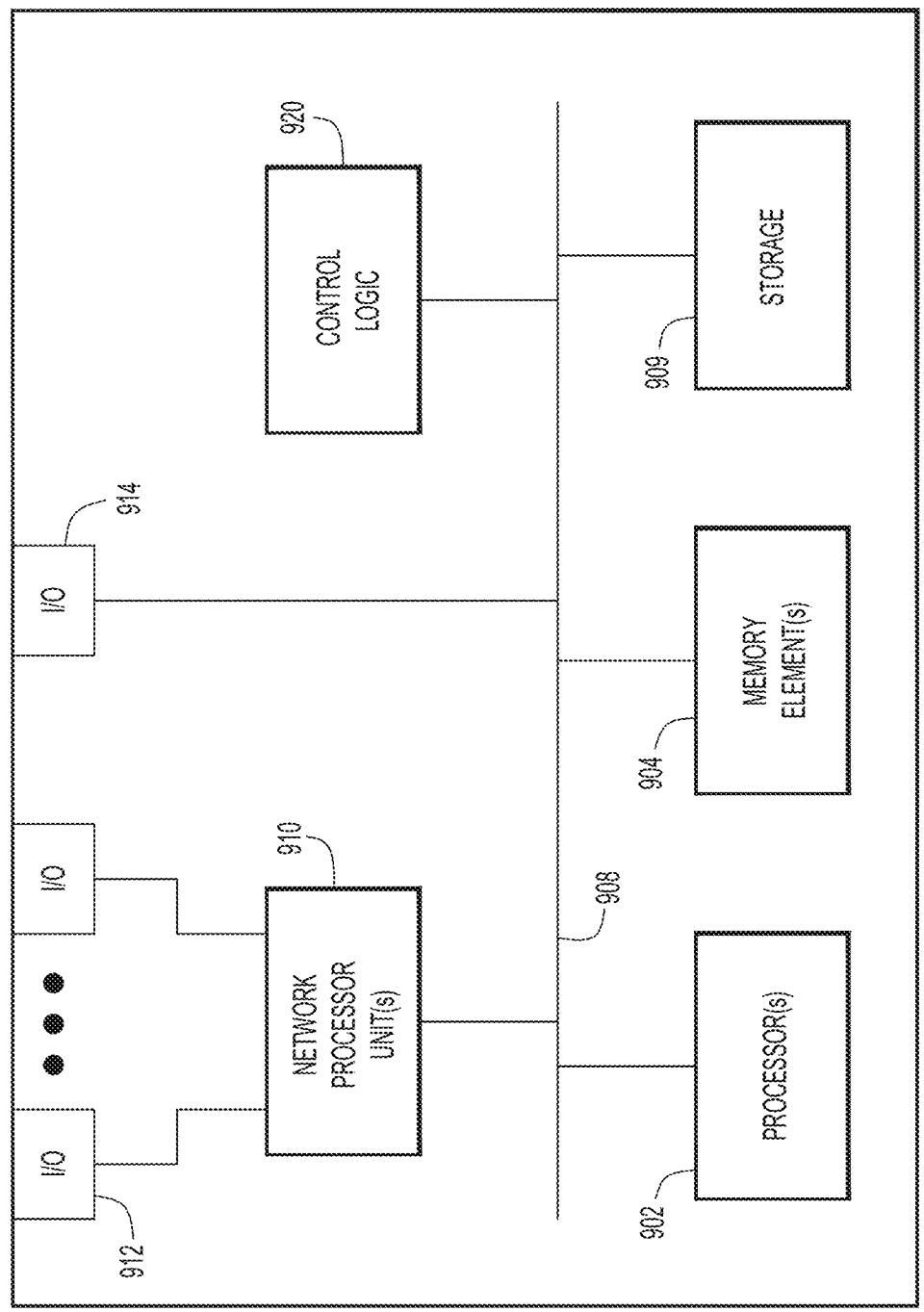
FIG. 9 is a block diagram of a device that may be configured to perform the speech recognition techniques presented herein, according to an example embodiment.

Referring to FIG. 9, FIG. 9 illustrates a hardware block diagram of a computing device 900 that may perform functions associated with operations discussed herein in connection with the techniques depicted in FIGS. 1A, 1B, 2A, 2B and 3-8. In various embodiments, a computing device, such as computing device 900 or any combination of computing devices 900, may be configured as any entity/entities (e.g., meeting server 125 shown in FIG. 1A) as discussed for the techniques depicted in connection with FIGS. 1A, 1B, 2A, 2B and 3-8 in order to perform operations of the various techniques discussed herein.

In at least one embodiment, the computing device 900 may include one or more processor(s) 902, one or more memory element(s) 904, storage 909, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 909 is/are configured to store data, information, software, and/or instructions associated with computing device 900, and/or logic configured for memory element(s) 904 and/or storage 909. For example, any logic described herein (e.g., control logic 920) can, in various embodiments, be stored for computing device 900 using any combination of memory element(s) 904 and/or storage 909. Note that in some embodiments, storage 909 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computer device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 909 can store data, software, code, instructions (e.g., processor instructions), logic, parameters, combinations thereof, and/or the like used for operations described herein. This includes memory element(s) 904 and/or storage 909 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, provided for herein are techniques that configure an automatic speech recognition engine to detect certain words on-the-fly during a speech recognition session. In one form, a computer implemented method is provided that includes: obtaining audio data as part of an automatic speech recognition session; obtaining speech hints as part of the automatic speech recognition session; generating a dynamic language model from the speech hints; generating a combined language model from the dynamic language model and a static language model; and converting, as part of the automatic speech recognition session, the audio data to text using the combined language model.

Also provided for herein is an apparatus comprising one or more network interfaces and one or more processors. The one or more processors are configure to: obtain, via the one or more network interfaces, audio data as part of an automatic speech recognition session; obtain, via the one or more network interfaces, speech hints as part of the automatic speech recognition session; generate a dynamic language model from the speech hints; generate a combined language model from the dynamic language model and a static language model; and convert, as part of the automatic speech recognition session, the audio data to text using the combined language model.

The techniques of the present disclosure also provide for one or more tangible, non-transitory computer readable mediums encoded with instructions. The instructions, when executed by one or more processors, are operable to: obtain audio data as part of an automatic speech recognition session; obtain speech hints as part of the automatic speech recognition session; generate a dynamic language model from the speech hints; generate a combined language model from the dynamic language model and a static language model; and convert, as part of the automatic speech recognition session, the audio data to text using the combined language model.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining audio data as part of an automatic speech recognition session;
   obtaining speech hints as part of the automatic speech recognition session;
   generating a dynamic language model from the speech hints;
   generating a combined language model from the dynamic language model and a static language model by splicing finite state transducer arcs from the dynamic language model into placeholder finite state transducer arcs in the static language model; and
   converting, as part of the automatic speech recognition session, the audio data to text using the combined language model.

2. The method of claim 1, wherein:
   obtaining the audio data comprises obtaining audio data containing data for a plurality of utterances;
   generating the dynamic language model comprises generating a respective dynamic language model for each of the plurality of utterances;
   generating the combined language model comprises generating a respective combined language model for each of the plurality of utterances using the respective dynamic language model for each of the plurality of utterances; and
   converting the audio data to text comprises converting each of the plurality of utterances to text using the respective combined language model for each of the plurality of utterances.

3. The method of claim 2, wherein generating the combined language model for each of the plurality of utterances comprises generating a combined language model for each of the plurality of utterances in one or more random access memories of a computing device.

4. The method of claim 3, further comprising deleting, from the one or more random access memories, the respective combined language model for each of the plurality of utterances subsequent to converting each of the plurality of utterances to text.

5. The method of claim 1, wherein the dynamic language model comprises a first finite state transducer, the static language model comprises a second finite state transducer; and the combined language model comprises a third finite state transducer.

6. The method of claim 1, wherein generating the combined language model comprises splicing an Advanced Research Projects Agency Language Model format value from the dynamic language model into the static language model.

7. The method of claim 1, where obtaining the audio data comprises obtaining an audio data stream.

8. The method of claim 1, wherein obtaining the speech hints comprises obtaining text data.

9. An apparatus comprising:
   one or more network interfaces; and
   one or more processors, wherein the one or more processors are configured to:
      obtain, via the one or more network interfaces, audio data as part of an automatic speech recognition session;
      obtain, via the one or more network interfaces, speech hints as part of the automatic speech recognition session;
      generate a dynamic language model from the speech hints;
      generate a combined language model from the dynamic language model and a static language model by splicing finite state transducer arcs from the dynamic language model into placeholder finite state transducer arcs in the static language model; and
      convert, as part of the automatic speech recognition session, the audio data to text using the combined language model.

10. The apparatus of claim 9, wherein the one or more processors are configured to:
    obtain the audio data by obtaining audio data containing data for a plurality of utterances;
    generate the dynamic language model by generating a respective dynamic language model for each of the plurality of utterances;
    generate the combined language model by generating a respective combined language model for each of the plurality of utterances using the respective dynamic language model for each of the plurality of utterances; and
    convert the audio data to text by converting each of the plurality of utterances to text using the respective combined language model for each of the plurality of utterances.

11. The apparatus of claim 10, further comprising one or more random access memories, wherein the one or more processors are configured to generate the combined language model for each of the plurality of utterances by generating a combined language model for each of the plurality of utterances in the one or more random access memories.

12. The apparatus of claim 11, wherein the one or more processors are further configured to delete, from the one or more random access memories, the respective combined language model for each of the plurality of utterances subsequent to converting each of the plurality of utterances to text.

13. The apparatus of claim 9, wherein the one or more processors are configured to obtain the audio data by obtaining an audio data stream.

14. The apparatus of claim 9, wherein the one or more processors are configured to obtain the speech hints by obtaining text data.

15. One or more tangible, non-transitory computer readable mediums encoded with instructions, wherein the instructions, when executed by one or more processors, are operable to:
    obtain audio data as part of an automatic speech recognition session;
    obtain speech hints as part of the automatic speech recognition session;
    generate a dynamic language model from the speech hints;

generate a combined language model from the dynamic language model and a static language model by splicing finite state transducer arcs from the dynamic language model into placeholder finite state transducer arcs in the static language model; and convert, as part of the automatic speech recognition session, the audio data to text using the combined language model.

16. The one or more tangible, non-transitory computer readable mediums of claim 15, wherein:

the instructions operable to obtain the audio data comprise instructions operable to obtain audio data containing data for a plurality of utterances;

the instructions operable to generate the dynamic language model comprise instructions operable to generate a respective dynamic language model for each of the plurality of utterances;

the instructions operable to generate the combined language model comprise instructions operable to generate a respective combined language model for each of the plurality of utterances using the respective dynamic language model for each of the plurality of utterances; and the instructions operable to convert the audio data to text comprise instructions operable to convert each of the plurality of utterances to text using the respective combined language model for each of the plurality of utterances.

17. The one or more tangible, non-transitory computer readable mediums of claim 16, wherein the instructions operable to generate the combined language model for each of the plurality of utterances comprise instructions operable to generate a combined language model for each of the plurality of utterances in one or more random access memories of a computing device.

18. The one or more tangible, non-transitory computer readable mediums of claim 17, further comprising instructions operable to delete, from the one or more random access memories, the respective combined language model for each of the plurality of utterances subsequent to converting each of the plurality of utterances to text.

19. The one or more tangible, non-transitory computer readable mediums of claim 15, wherein the instructions operable to obtain the audio data comprise instructions operable to obtain an audio data stream.

20. The one or more tangible, non-transitory computer readable mediums of claim 15, wherein the instructions operable to obtain the speech hints comprise instructions operable to obtain text data.

* * * * *